(12) United States Patent
Israni et al.

(10) Patent No.: US 10,111,453 B2
(45) Date of Patent: Oct. 30, 2018

(54) METHOD AND APPARATUS FOR PRODUCING FROZEN FOOD PRODUCTS

(71) Applicants: Sameer H. Israni, Darien, IL (US); Balazs Hunek, Western Springs, IL (US); Theodore H. Gasteyer, III, Naperville, IL (US); Gary D. Lang, Naperville, IL (US)

(72) Inventors: Sameer H. Israni, Darien, IL (US); Balazs Hunek, Western Springs, IL (US); Theodore H. Gasteyer, III, Naperville, IL (US); Gary D. Lang, Naperville, IL (US)

(73) Assignee: PRAXAIR TECHNOLOGY, INC., Danbury, CT (US)

( * ) Notice: Subject to any disclaimer, the term of this patent is extended or adjusted under 35 U.S.C. 154(b) by 573 days.

(21) Appl. No.: 14/681,714

(22) Filed: Apr. 8, 2015

(65) Prior Publication Data

US 2015/0296859 A1    Oct. 22, 2015

Related U.S. Application Data

(60) Provisional application No. 61/980,490, filed on Apr. 16, 2014.

(51) Int. Cl.
| | | |
|---|---|---|
| A23L 3/375 | (2006.01) | |
| A23G 9/04 | (2006.01) | |
| A23P 30/40 | (2016.01) | |

(52) U.S. Cl.
CPC ............. *A23L 3/375* (2013.01); *A23G 9/04* (2013.01); *A23P 30/40* (2016.08); *A23V 2002/00* (2013.01)

(58) Field of Classification Search
CPC .. A23G 9/04; A23G 9/46; A23L 3/375; A23P 30/40; A23V 2002/00
See application file for complete search history.

(56) References Cited

U.S. PATENT DOCUMENTS

| | | |
|---|---|---|
| 3,360,384 A | 12/1967 | Kurzinski et al. |
| 4,031,262 A | 6/1977 | Nakayama et al. |
| 4,310,559 A | 1/1982 | Mita et al. |
| 4,687,672 A | 8/1987 | Vitkovsky |
| 2006/0040028 A1 | 2/2006 | Larson |
| 2007/0071866 A1* | 3/2007 | Cox ............... A23C 9/1524 426/565 |
| 2007/0231439 A1 | 10/2007 | Yuan et al. |
| 2008/0089979 A1 | 4/2008 | Yuan |
| 2013/0095223 A1 | 4/2013 | Nayini et al. |
| 2014/0308423 A1 | 10/2014 | Nayini et al. |

FOREIGN PATENT DOCUMENTS

| | | |
|---|---|---|
| WO | WO 00/01246 | 1/2000 |
| WO | WO 2005/031226 A1 | 4/2005 |

\* cited by examiner

*Primary Examiner* — Steven N Leff
(74) *Attorney, Agent, or Firm* — Donald T. Black

(57) ABSTRACT

Disclosed are methods and apparatus for forming frozen food products, especially frozen foamed food products wherein the products contain bubbles having a reduced average size preferably in a narrow size range or contain ice crystals having reduced size.

3 Claims, 8 Drawing Sheets

METHOD AND APPARATUS FOR PRODUCING FROZEN FOOD PRODUCTS

CROSS REFERENCE TO RELATED APPLICATIONS

This application claims the benefit of priority to U.S. provisional application Ser. No. 61/980,490 filed on Apr. 16, 2014, the disclosure of which is incorporated by reference herein in its entirety.

TECHNICAL FIELD

The present invention relates to foam products and, more particularly, to a method and system for improving the stability and sensory attributes of cold or frozen food foam products including ice creams and non-dairy foam products such as icings and toppings.

BACKGROUND OF THE INVENTION

Most frozen products have poor thermal conductivity since ice is a poor conductor of heat. The poor thermal conductivity significantly slows down the freezing process, which for many frozen products negatively affects their quality. If the frozen product is additionally foamed, e.g. in ice creams, the thermal conductivity is especially poor, and therefore the quality issues due to slow freezing are more pronounced.

Commercially produced ice cream products are essentially an emulsion which is foamed and frozen. FIG. 1 illustrates and outlines a standard process flow diagram for the current method of manufacturing frozen food foams such as ice creams. The ingredients (105) are first mixed together (110) and then pasteurized (115) to kill micro-organisms. The mix is then homogenized (120) by passing through high pressure valves in order to provide a more stable oil-in-water (o/w) emulsion. The homogenized mix is then mixed with the desired flavors and colors (125) and allowed to age, for instance at approximately 40 degrees Fahrenheit for a suitable time such as 4 to 8 hours. During the ageing process (130), multiple changes occur on the surface of the dispersed fat droplets contained within the homogenized mix and this prepares the mix for partial coalescence. Next, the mix is partially frozen, typically in a scraped surface heat exchanger or freezer. Air (135) is normally introduced into the mix during this freezing process (140) or in some cases the air can be provided just prior to the freezer using various kinds of pre-aerators. Next, any inclusions and/or variegates (145) are added to the product. The product is then packaged (150) and finally hardened. Hardening (155) is a more complete freezing of the product to reduce the unfrozen fraction of the product while also increasing viscosity and is typically carried out in mechanical blast freezers. For some products, like ice cream novelties, the hardening step may occur before the product is packaged.

The ice cream manufacturing steps generally include: mixing the liquid and dry ingredients; pasteurization and homogenization (in either order) followed by addition of flavors and colors. The product is then aged during the ageing step, after which, air is introduced. During the ageing step, the homogenized and pasteurized mixture is generally cooled down to about 35 degrees Fahrenheit to 40 degrees Fahrenheit and stored for at least 4 hours in tanks with minimum agitation. The main purpose of the ageing step is to promote fat destabilization. In other words, the ageing step provides time for the emulsifiers in the product to displace proteins from the fat globule surface which reduces the membrane thickness of the fat globule and makes it more susceptible to coalescence. Also, the ageing step provides time for partial fat crystallization, so that the fat globules can also partially coalesce. In general about 30 percent to about 50 percent of the fat crystallizes during the typical ageing step and the fat droplets partially coalesce yielding a fat droplet network.

After ageing, the foam product is next directed to a conventional scraped surface heat exchanger where the product is subjected to the freezing and aerating step. The air may be incorporated into the aged mix prior to the scraped surface heat exchanger, using a device such as a mechanical pre-aerator, or may be directly introduced into the scraped surface heat exchanger. The typical residency time of product within the scraped surface heat exchanger is normally between about 30 to 120 seconds. During this freezing and aerating step, the air bubbles are incorporated, broken into smaller bubbles, and distributed within the ice cream product while the product undergoes partial freezing (e.g. about 30 to 50 percent of the water in the ice cream is frozen). The ice cream product is also normally whipped or agitated to further promote fat destabilization. Upon exiting the scraped surface heat exchanger, the ice cream product exhibits a temperature of about 20 degrees Fahrenheit and a viscosity typically between about 1000 to 5000 centipoise.

Upon exiting the scraped surface heat exchanger, the foam product is subsequently packaged and then hardened in a spiral or tunnel freezer. The targeted final temperature of the ice cream product is between 0 degrees Fahrenheit and minus 20 degrees Fahrenheit resulting in freezing about 60 to 85 percent of the water in the ice cream product. The residence time in the hardening freezer very much depends on numerous parameters including the size of the ice cream packaging and "overrun". The term "overrun", is used to indicate how much air or other gas a particular ice cream contains. It is basically the ratio of the volume of the ice cream, less the volume of the liquid ice cream mix, divided by the volume of the liquid ice cream mix. So, if 50 percent of the volume of the ice cream is air, the overrun would be 100 percent.

In frozen foams such as ice creams, increasing the overrun results in a decrease in the percentage of other ingredients (e.g. milk fat, carbohydrates, stabilizers, etc) required, which in turn results in cost savings. Of particular value in ice cream products is reduction of the milk fat ingredient which allows for improving the dietary and nutritional characteristics of the ice cream product. Typically one would limit the overrun due to regulatory based restrictions on overrun (e.g. maximum allowable overrun) or because the overrun adversely affects the sensory and physical properties of the foam product that may occur with too much of an increase in overrun.

During the hardening step, the mechanical freezers chill the outside of the ice cream surface or packaging material with cold air, and rely on the thermal conductivity of the packaging materials and the ice cream product to chill the rest of the ice cream. However, foams like ice cream are very poor thermal conductors. Due to this, the center of the ice cream takes a long time to chill during the hardening process. Thus, during a large part of the hardening process, the viscosity of most of the ice cream is low. Thus, typically, ice crystals and air bubbles in the ice cream product rise sharply in size during the packaging and hardening steps. The quantity and size of these bubbles greatly influence the physico-chemical properties of the final foam product. In particular, there is a significant increase in average bubble size and coalescence during the hardening step due to gas bubble disproportionation and coalescence.

The ingredients typically used in most commercially available ice cream products consists of: (i) milkfat; (ii) milk solids not fat (MSNF) such as proteins, casein, whey proteins, etc.; (iii) carbohydrates (e.g. lactose) and sweeteners, such as sucrose or corn syrup; (iv) water; (v) stabilizers and surfactants, including gelatins, gums, sodium alginate, carrageenan, etc. and surfactants; (vi) emulsifiers, such as mono-glycerides, di-glycerides, polysorbates, polyglycerins, and combinations thereof; and (vii) air or other gas bubbles.

In general, the milk fat typically represents about 10 to 16 weight percent of the liquid ice cream mix and provides flavor, texture and smoothness to the ice cream. A continuing challenge for ice cream manufacturers is to lower the milkfat content in the ice cream product while maintaining the sensory feel and taste of the ice cream.

The MSNF, and more particularly, the proteins within the MSNF, improve the texture of the ice cream (e.g. body and bite) and also help emulsify and whip the fats during manufacturing of the ice cream product. The carbohydrates, sweeteners, and any added flavorings are included to generally improve the taste of the ice cream, including sweetness, palatability, and texture. The carbohydrates also tend to aid in freezing point depression of the ice cream product which improves the scoopability of the ice cream product. The water represents about 55 to 64 weight percent of the liquid ice cream mix and provides the source of ice crystals in the ice cream product. If the ice crystal content is properly controlled this tends to also improve scoopability. The stabilizers and surfactants are used to add stability to the ice cream product during and after manufacture and possibly improve the sensory feel of the ice cream upon consumption. Finally, the emulsifiers are used primarily for fat destabilization through displacement of proteins on the surface of the fat droplets.

Typically, about 30 to 50 percent of the total ice cream volume is either air or another gas which functions to improve the taste (e.g. creaminess) and texture desired by customers.

Stability of the final ice cream product is achieved by controlling the size and distribution of fat globules, ice crystals, and air bubble globules in the ice cream product. Optimized fat globule size and distribution is often achieved during the homogenization, ageing, and freezing steps in ice cream manufacture. During the ageing and freezing of the ice cream mix, the fat droplets partially coalesce to form a structural network within the liquid ice cream mix and this network of fat droplets coats the surface of the introduced air bubbles to provide stability (See FIG. 2). FIG. 2 depicts an enlarged view illustrating the key constituents of the microstructure of a typical food foam product (during processing). The gas bubbles (210) and ice crystals (220) are generally well dispersed throughout the continuous phase of the unfrozen liquid phase (240). During the manufacturing process the fat droplets undergo partial coalescence yielding a 3-dimensional network that provides a support structure for the product. This network of partially coalesced fat droplets (230) tends to stick to the surface of the gas bubbles due to their hydrophobic nature and therefore contribute to the stability of the bubbles. The lower the level of fat, the lower the resultant gas bubble stability of the product. During the initial stages of hardening, the microstructure is most susceptible to change. This is mainly due to the low viscosity of the continuous phase which allows for bubble and ice crystal growth and channeling. Once hardened, the rate of change is extremely slow.

Ideally, an ice cream manufacturer would seek to develop an ice cream product with the smallest size and most uniform distribution of air or gas bubbles and ice crystals and retain this uniform dispersion of air or gas bubbles and ice crystals both during and after manufacture.

One manifestation of the stability problem in many foam products such as ice cream (as well as whipped cream, icing or topping) is commonly referred to as the "altitude problem". The altitude problem is defined as the degradation in the quality and stability of foam products during transportation or storage, due to pressure variations resulting from altitude changes occurring en-route. For example, when foam products are transported from a low altitude location to a high altitude location the ambient pressure proximate the foam product decreases. This change in ambient pressure causes the gas in the foam product to expand, which in turn adversely impacts the stability of the foam structure. In many cases, this gas expansion in the foam product results in coalescence of the individual gas bubbles and ultimately leads to a channeling effect and escape of the gas from the foam product. Because the trapped air or gas bubbles form a significant portion of the total foam product volume, any change in volume of trapped air or gas bubbles due to pressure variations may lead to product damage, leakage and, in some cases, container deformation during shipping of the foam product to higher altitudes. On the other hand, when the expanded foam products are transported from the high altitude location to a lower altitude location, the ambient pressure proximate the foam product increases causing contraction of the foam, which causes the product to appear to have shrunk.

Another manifestation of the stability problem is "shrinkage". Shrinkage itself is an umbrella term that describes the reduction in volume of the final product such that the package appears only partially full. The main reason for shrinkage is a lack of bubble stability that causes coalescence and further escape of the gas from the product. Changes in altitude can precipitate shrinkage as described above, but in many cases product stored at constant pressures will also undergo shrinkage.

There is therefore, a continuing need in the industry for a method to improve the stability, homogeneity, and quality, and to reduce the manufacturing cost without adversely impacting the quality of ice creams and other food foams. In particular, there is a need to reduce or mitigate the stability problems associated with altitude in many ice creams and other food foams such as whipped products, icings and toppings as well as refrigerated, partially or fully frozen forms of the same.

BRIEF SUMMARY OF THE INVENTION

The present invention has numerous aspects.

One aspect of the invention is a method for forming a frozen foamed food product comprising the steps of:

(A) introducing a nontoxic gas or gas mixture into a product to be foamed under foaming conditions to form a foam product containing bubbles of said gas or gas mixture, (B) concurrently with or subsequent to step (A), chilling said foam product under chilling conditions to form a partially frozen foam product; and then (C) increasing the viscosity of said partially frozen foam product by adding into the partially frozen foam product a plurality of bits of edible material having a size (as defined herein) of 0.25 to 2 inch, wherein the size distribution of said bits that are added has a standard deviation of less than or equal to 15%, wherein said bits that are added are at a temperature of less than minus 25 F, thereby forming a further frozen foam product, and then (D) hardening the further frozen food product by further chilling it under further chilling conditions to freeze additional liquid therein, thereby forming a frozen foamed food product, under conditions effective to establish bubbles in said frozen foamed food product having an average bubble size at least 15% smaller than the average bubble size in the hardened product that is formed by introducing solely air as the gas or gas mixture into the identical product to be foamed under the identical foaming conditions as in step (A) to form an air foamed product and chilling said air foamed product in the same relationship to step (A) and under the identical chilling conditions as in step (B) to form a product which is then hardened under the identical further chilling conditions as in step (D).

Another aspect of the invention is a method for forming a frozen foamed food product comprising the steps of:

(A) introducing a nontoxic gas or gas mixture into a product to be foamed under foaming conditions to form a foam product containing bubbles of said gas or gas mixture, (B) concurrently with or subsequent to step (A), chilling said foam product under chilling conditions to form a partially frozen foam product; and then (C) increasing the viscosity of said partially frozen foam product by adding into the partially frozen foam product a plurality of bits of edible material having a size (as defined herein) of 0.25 to 2 inch, wherein the size distribution of said bits that are added has a standard deviation of less than or equal to 15%, wherein said bits that are added are at a temperature of less than minus 25 F, thereby forming a further frozen foam product, and then (D) hardening the further frozen food product by further chilling it under further chilling conditions to freeze additional liquid therein, thereby forming a frozen foamed food product,
under conditions effective to establish ice crystals in said frozen foamed food product having an average crystal size at least 15% smaller than the average ice crystal size in the hardened product that is formed by introducing solely air as the gas or gas mixture into the identical product to be foamed under the identical foaming conditions as in step (A) to form an air foamed product and chilling said air foamed product in the same relationship to step (A) and under the identical chilling conditions as in step (B) to form a product which is then hardened under the identical further chilling conditions as in step (D).

Another aspect of the present invention is a method for forming a frozen foamed food product comprising the steps of:

(A) introducing a nontoxic gas or gas mixture into a product to be foamed under foaming conditions to form a foam product containing bubbles of said gas or gas mixture, (B) increasing the viscosity of said partially frozen foam product by adding into the partially frozen foam product a plurality of bits of edible material having a size (as defined herein) of 0.25 to 2 inch, wherein the size distribution of said bits that are added has a standard deviation of less than or equal to 15%, wherein said bits that are added are at a temperature of less than minus 25 F, thereby forming a further frozen foam product, and then (C) hardening the further frozen food product by further chilling it under further chilling conditions to freeze additional liquid therein, thereby forming a frozen foamed food product, under conditions effective to establish bubbles in said frozen foamed food product having an average bubble size at least 15% smaller than the average bubble size in the hardened product that is formed by introducing solely air as the gas or gas mixture into the identical product to be foamed under the identical foaming conditions as in step (A) to form an air foamed product which is then hardened under the identical further chilling conditions as in step (C).

Yet another aspect of the present invention is a method for forming a frozen foamed food product comprising the steps of:

(A) introducing a nontoxic gas or gas mixture into a product to be foamed under foaming conditions to form a foam product containing bubbles of said gas or gas mixture, (B) increasing the viscosity of said partially frozen foam product by adding into the partially frozen foam product a plurality of bits of edible material having a size (as defined herein) of 0.25 to 2 inch, wherein the size distribution of said bits that are added has a standard deviation of less than or equal to 15%, wherein said bits that are added are at a temperature of less than minus 25 F, thereby forming a further frozen foam product, and then (C) hardening the further frozen food product by further chilling it under further chilling conditions to freeze additional liquid therein, thereby forming a frozen foamed food product, under conditions effective to establish ice crystals in said frozen foamed food product having an average crystal size at least 15% smaller than the average ice crystal size in the hardened product that is formed by introducing solely air as the gas or gas mixture into the identical product to be foamed under the identical foaming conditions as in step (A) to form an air foamed product which is then hardened under the identical further chilling conditions as in step (C).

Another aspect of the present invention is a method for forming a frozen food product comprising the steps of:

(A) chilling an edible product under chilling conditions to form a partially frozen food product; and then (B) increasing the viscosity of said partially frozen food product by adding into the partially frozen product a plurality of bits of edible material having a size (as defined herein) of 0.25 to 2 inch, wherein the size distribution of said bits that are added has a standard deviation of less than or equal to 15%, wherein said bits that are added are at a temperature of less than minus 25 F, thereby forming a further frozen food product, and then (C) hardening the further frozen food product by further chilling it under further chilling conditions to freeze additional liquid therein, thereby forming a frozen foamed food product, under conditions effective to establish ice crystals in said frozen foamed food product having an average crystal size at least 15% smaller than the average ice crystal size in the hardened product that is formed by chilling said product under the identical chilling conditions as in step (A) to form a product which is then hardened under the identical further chilling conditions as in step (C).

In another aspect, the present invention is a method for forming a frozen foamed food product comprising the steps of:

(A) introducing a nontoxic gas or gas mixture into a product to be foamed under foaming conditions to form a foam product containing bubbles of said gas or gas mixture, (B) concurrently with or subsequent to step (A), chilling said foam product under chilling conditions to form a partially frozen foam product; and then (C) increasing the viscosity of said partially frozen foam product by adding into the partially frozen foam product a plurality of bits of edible material having a size (as defined herein) of 0.25 to 2 inch, wherein the size distribution of said bits that are added has a standard deviation of less than or equal to 15%, wherein said bits that are added are at a temperature of less than minus 25 F, while controlling both the rate of heat transfer from the bits to the partially frozen foam product and the rate of increase of the viscosity of the partially frozen foam product, thereby forming a further frozen foam product, and then (D) hardening the further frozen food product by further chilling it under further chilling conditions to freeze additional liquid therein, thereby forming a frozen foamed food product.

Another aspect of the present invention is a method for forming a frozen food product comprising the steps of:

(A) chilling an edible product under chilling conditions to form a partially frozen food product; and then (B) increasing the viscosity of said partially frozen foam product by adding into the partially frozen foam product a plurality of bits of edible material having a size (as defined herein) of 0.25 to 2 inch, wherein the size distribution of said bits that are added has a standard deviation of less than or equal to 15%, wherein said bits that are added are at a temperature less than minus 25 F, while controlling both the rate of heat transfer from the bits to the partially frozen foam product and the rate of increase of the viscosity of the partially frozen foam product, thereby forming a further frozen foam product, and then (C) hardening the further frozen food product by further chilling it under further chilling conditions to freeze additional liquid therein, thereby forming a frozen foamed food product.

Additional preferred aspects of the above invention include, (a) Carrying out the deep freezing of the plurality of bits formed from the secondary stream by immersing them in a liquid cryogen like liquid nitrogen for the amount of time required to drop their temperature to the desired level.

(b) Controlling the average temperature of the deep frozen bits formed from the secondary stream to between −50 degrees Fahrenheit to −100 degrees Fahrenheit in order to avoid appearance issues like voids in the final hardened product and to avoid operational issues like pipeline freeze ups.

(c) Controlling the size distribution of the plurality of bits formed from the above mentioned secondary portion of the partially frozen foam such that the standard deviation of the average size of these bits is at or below 15% and more preferably at or below 5% in order to avoid operational issues like pipeline freeze ups.

(d) Controlling the average size of the plurality of bits formed from the above mentioned secondary stream of the partially frozen foam to be between 0.25 to 2 inches and preferably the average bit size to be between 0.5 to 1 inches and more preferably to be 0.75 inches, in order not avoid operational issues like pipeline freeze ups. Controlling the increase in percent frozen solids in the recombined stream to be at least 2 weight %, and preferably at least 5 weight % and more preferably at least 10 weight %, wherein the wt. % of frozen solids is based on the amount of liquid that is present in the product at the end of step (A), i.e. the introduction of the gas or gas mixture (e) Using the following equation to control the initial rate of heat transfer, q/t, between 0.75 and 1.25 BTU per minute per pound of total product $$\frac{q}{t} = \frac{3k}{\rho} \frac{(\% SS)}{r^2 \left( \left( \frac{2/3\pi}{(\% SS)} \right)^{0.33} - 1 \right)} (T_{ice\ cream} - T_{bits}).$$

where, as described in more detail below, $\rho$=density of ice cream, k=heat transfer coefficient, $T_{ice\ cream}$=temperature of bulk ice cream, $T_{bits}$=temperature of deep frozen bits, % SS=weight percent of secondary stream of total product flow rate, r=half the size of the deep frozen bits.

(f) Controlling the wall temperature of part of or of the entire pipeline after the two portions have been recombined, such that the wall temperature is between plus 3 degrees Fahrenheit and minus 3 degrees Fahrenheit of the temperature of the partially frozen product just before it was split into two streams, and more preferably if it was the same as the temperature of the partially frozen product before it was split into two portions.

(g) Skipping the hardening step in all the above embodiments.

As used herein, the "size" of a bit means the diameter of a sphere having the same surface area as that of the bit. For example, a cylindrical-shaped bit with a diameter of 0.75 inch and a length of 0.5 inch has a surface area of 2.01 square inches, and the diameter of a sphere whose surface area is 2.01 square inches is 0.81 inch. Thus, the "size" of the bit in this illustration is 0.81 inch.

As used herein, "average bubble size" and "average ice crystal size" are the average of gas bubble equivalent diameters and the average size of the ice crystals respectively in a product determined as follows: Gas bubbles and ice crystals are analyzed using a light microscope (40× magnification) housed in an insulated chamber that can be controlled at a desired temperature. The product to be analyzed is initially equilibrated in the chamber to minus 24 degrees Celsius. A slice of the product is then taken from the middle of the mass of the product, the top layer of the slice is removed and discarded, and the remainder of the slice is transferred to a microscope slide which has been equilibrated to minus 15 degrees Celsius. The slice thickness is 100 to 200 microns to provide a uniform flat plane for observation. Photographs of the slice including gas bubbles present therein are obtained by optical light microscopy at 40× magnification. The outline of the gas bubbles and ice crystals are traced and analyzed for equivalent diameter. For each sample, the equivalent diameters of a minimum of 300 to a maximum of 350 gas bubbles are measured. The average of the equivalent diameters of all bubbles that are measured is determined to be the average gas bubble size of the foam product. Similarly, the average of the equivalent diameters of all ice crystals that are measured is determined to be the average ice crystal size of the foam product As used herein, "chilling from within" means adding into a product one or more objects whose temperature is lower than the temperature of the product into which the objects are added, so that the one or more objects directly contact the product, wherein the temperature of the product including the temperature in the interior of the product is lowered by direct heat transfer from the product to the one or more objects. Preferably, the objects become part of the product, either as articles that can be observed in the product, or by their mass becoming fully incorporated into the mass of the product so as not to be separately observable.

BRIEF DESCRIPTION OF THE DRAWINGS

The above and other aspects, features, and advantages of the present invention will be more apparent from the following drawings, wherein.

DETAILED DESCRIPTION OF THE INVENTION

The present invention is useful in the production of frozen products which benefit from a faster rate of freezing and/or hardening. The frozen products may or may not have gas dispersed therein. Preferred products formed in accordance with this invention are edible products, such as ice cream, ice milk, sherbets, sorbets, water ices, whipped creams, toppings and frostings. Other products that can be produced in accordance with this invention include bulk pharmaceuticals, pet foods, metals, bread, pastries, dough from which baked products can be made, juices, and meat-containing products. The following discussion uses ice cream as an example product to illustrate the invention.

When the present invention includes a foam-forming step, it forms a foam starting from a product that is to be foamed. The product that is to be foamed can be provided by mixing together the desired ingredients in the desired amounts, or can be provided by obtaining it from any suitable source where it has already been produced by combining the desired ingredients such that the operator does not need to combine ingredients to provide the product that is to be foamed. For example, an ice cream manufacturer may combine the desired ingredients to form a premix that is to be foamed, or the manufacturer may obtain from an independent source an ice cream premix in which the desired ingredients have already been combined.

The product to be frozen, or to be foamed when a foamed product is desired, will include solids, namely the solid components of the desired final product, and a liquid component, which may itself be one substance or a mixture of liquid substances. The liquid may have one or more solutes dissolved in it. The most typical liquid is water. Other liquids may be present in addition to water, or instead of water, such as oils and/or alcohols. The product to be foamed in accordance with the present invention may contain 1 wt. % to 99 wt. % liquid, preferably 30 wt. % to 95 wt. % liquid.

Figure 3:
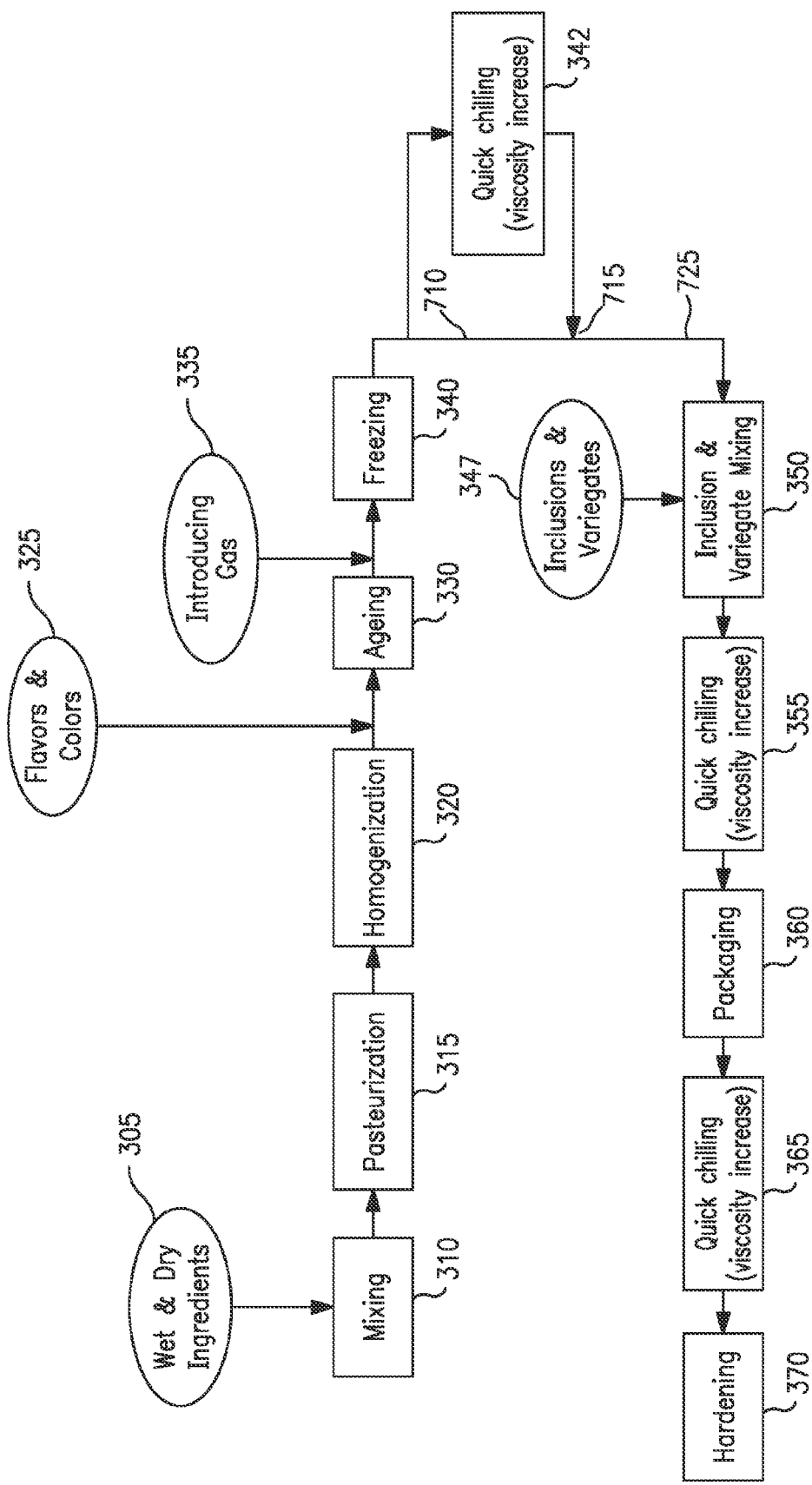
FIG. 3 is a process flowsheets including embodiments of the present invention.

FIG. 3 show the details of the present invention for the example process of manufacture of frozen foams, such as ice cream. For the manufacture of a non-foamed frozen product the step of adding a gas or gas mixture (335) is simply skipped in stage (340).

If the product to be foamed has not already been prepared, then it is prepared by mixing the ingredients (305) in step (310). The product can then be pasteurized in stage (315) to kill micro-organisms. The product can then be homogenized in stage (320) such as by passing through high pressure valves, in order to provide a more stable oil-in-water (o/w) emulsion, if the components of the product justify such treatment. If the product to be foamed has already been prepared, then stage (310) is avoided and the product is submitted directly to stages (315) and (320) as desired. The product is then mixed if desired with desired flavors and colors (325) and can be allowed to age in stage (330), for example at approximately 40 degrees Fahrenheit for a suitable length of time such as 4 to 8 hours. In the case of products such as ice cream, during the ageing stage, multiple changes occur on the surface of the dispersed fat droplets contained within the homogenized composition and this prepares the product for partial coalescence.

Stage (340) denotes the formation of a partially frozen foam product. If formation of a foamed product is desired, stage (340) includes the introduction of a gas or gas mixture (335) into the product. Stage (342) denotes the step of increasing the viscosity of the partially frozen foam product. These stages are described below in more detail.

Inclusions and variegates (347) are optionally added to the product in stage (350). The inclusions and variegates can be added together or separately. The product can then be packaged (stage (360)) and can be subjected to hardening (stage (370)). Stages (355) and (365) denote optional viscosity increasing stages each of which can be in addition to, or in lieu of, stage (345).

The Gas or Gas Mixture

As seen in FIG. 3, stage (335) denotes the introduction of a gas or gas mixture into the product to be foamed. This gas or gas mixture preferably comprises air, or one or more of argon, krypton or xenon, or mixtures thereof, or mixtures of any of the foregoing with other gases or gas mixtures (such as air), where the gas or gas mixture can also contain nitrogen. The gas or gas mixture used can be air, or it can be a gas or gas mixture which has an average molecular weight greater than that of air. The ratio of the amount of gas or gas mixture introduced into the product to be foamed, to the amount of product into which the gas or gas mixture is introduced, is preferably 0.05:1 to 7.5:1, by volume. Where the desired end product is intended to be edible, the gas or gas mixture is preferably nontoxic, by which is meant that contact with the gas in the course of producing the foam product, or ingestion of the gas or gas product in the course of consuming the foam product, does not cause death or illness to a person who contacts it or ingests it. Gases such as helium, carbon dioxide, oxygen, nitrous oxide, argon, xenon, krypton, and nitrogen are thus to be considered nontoxic.

Forming a Partially Frozen Foam Product

The product is treated in stage (340) to partially freeze it, typically in a scraped surface freezer or other functionally equivalent heat exchanger. This stage is preferred but is optional in that some products, such as non-dairy whipped toppings, can be produced without the need for this stage.

When stage (340) is included, and when a gas or gas mixture is added to form a foam, the gas or gas mixture can be introduced into the product prior to, during, or both prior to and during this partial freezing stage (340). The gas or gas mixture is introduced into the product to be foamed in any of the many known techniques for feeding gas into such a product. The product is then subjected to a partial freezing step where the partially frozen foam product is formed using preferably a conventional scraped surface heat exchanger. The main objectives of this freezing and "aerating" or gassing step and of the scraped surface heat exchanger are to: (i) aspirate the dispersed foam product by incorporating and comminuting the gas bubbles within the foam product; (ii) partially freeze the foam product by generating a plurality of ice crystal nuclei within the foam product; and (iii) further whip the foam product to further promote fat destabilization. This gas or gas mixture can either be incorporated directly into the product in the scraped surface heat exchanger, or prior to the scraped surface heat exchanger using one or more of high shear mixing devices, pre-aerators, supersonic, or subsonic diffusers, spargers, and/or stripping devices. Preferably, the partially frozen foam product contains small gas bubbles and exhibits a narrow gas bubble size distribution, whether the bubble sizes have been achieved upon feeding of the gas or gas mixture or by the manner in which the product is treated after the gas or gas mixture is fed. Thus, in some embodiments the bubbles that are initially formed are larger than are desired in the final product.

The typical residence time of product within the scraped surface heat exchanger is normally between about 30 to 120 seconds. During this freezing and aerating step, the bubbles of the gas or gas mixture are incorporated, broken into smaller bubbles, and distributed within the product while the product undergoes partial freezing (e.g. about 20 to 50 percent of the liquid in the product is frozen). The product is also normally whipped or agitated to further promote fat destabilization. Upon exiting the scraped surface heat exchanger, the product typically exhibits a temperature of about 20 degrees Fahrenheit and a viscosity typically between about 1000 to 5000 centipoise. The product formed in this stage is partially frozen, by which is meant that it contains ice crystals but is soft, pliable and deformable. Typically up to 50 wt. %, and generally 20 wt. % to 50 wt. %, of the liquid present in the product is frozen.

The temperature of the ice cream at the exit of the scraped surface freezer, also referred to as draw temperature, is a very important parameter that determines the average size of the bubbles and ice crystals in the product at the exit of the scraped surface freezer and also in the final frozen product. Studies have shown that increasing the draw temperatures increases the average size of the gas bubbles and ice crystals in the final frozen product. Thus, for better product quality, it is preferable to have the lowest possible draw temperature. On the other hand, if the draw temperature is too low, the ice cream does not flow well and therefore causes many issues like excessive pipeline pressure drops.

Figure 4:
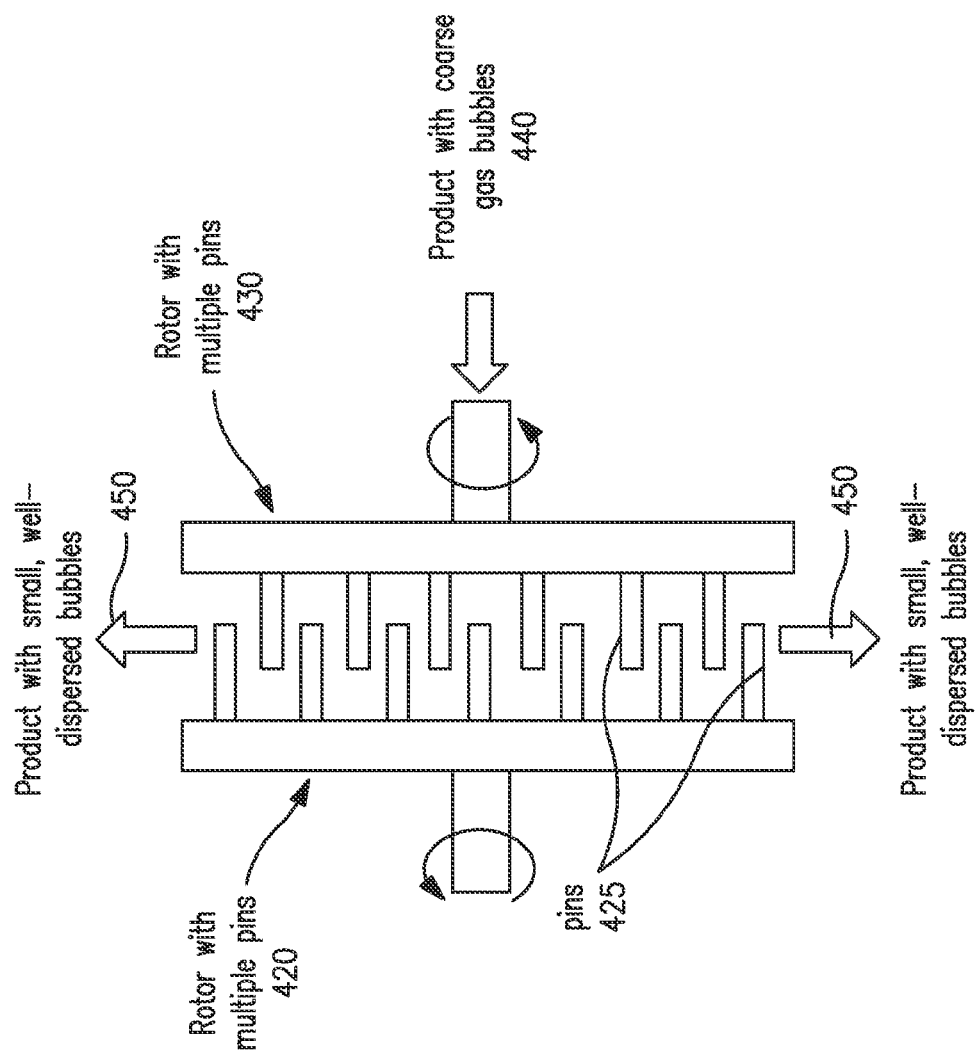
FIG. 4 is a cross-sectional schematic view of a pre-aerator suitable for creating and introducing small bubbles of a gas or gas mixture into a foam food product and useful in practicing the present invention.

A preferred device to generate and introduce the small gas bubbles into the product to be foamed is a pre-aerator, as shown in FIG. 4.

FIG. 4 is a schematic view showing the basic concepts associated with the device. The device includes two discs (420, 430) rotating close to each other in opposite directions. Alternatively, one disc could be rotating while the other is held stationary. The product with entrained coarse gas bubbles (440), previously formed by the gas or gas mixture having already been fed into the product, flows between these two discs and experiences very high shear rates that cause breakdown of the bubbles. The discs can have pins (425), as seen in FIG. 4, that further decrease the gap between the discs, therefore increasing the shear. The device thus forms fine, well-dispersed gas bubbles in the foam product (450). In ice cream manufacture, the whipping machines utilize pre-aerators to incorporate the gas before the foam enters the scraped surface freezer. The use of pre-aerators has been known to decrease the average gas bubble size in the frozen product, thereby increasing its quality. Other devices operating on the Venturi principle can also be used as pre-aerators. This technology preferably employs pre-aerators that can provide small, well-dispersed gas bubbles in the product that is to be foamed. The use of low diffusivity gas and quick chilling and freezing steps greatly reduces the growth of these gas bubbles and the ice crystals in the foam product.

Rapid Chilling/Freezing

The size and thus the properties of the gas bubbles in a frozen foam product, such as ice cream, can be further improved by minimizing disproportionation and coalescence of the gas bubbles during manufacturing of the foam product by rapidly increasing the viscosity of the product before a hardening step, and more preferably before and/or during a packaging step. Preferably, the viscosity of the partially frozen foam product is increased by rapidly chilling/freezing a portion of the product (preferably by use of cryogens) upstream of the packaging step, and then recombining the chilled or frozen portion with the remainder of the product, or by rapidly chilling the product directly by in-situ injection of cryogens as the product is being packaged. Rapid chilling/freezing can also be provided by direct or indirect heat transfer contact of the product with cryogen in the preaerator, in the partial freezing stage, and/or before, during or after the addition of inclusions to the product.

The partially frozen foam product from stage (340) is treated to increase its viscosity by chilling or freezing some or all of the foam product. This quick chilling/freezing step can be carried out in one stage such as stage (342) or in two or more stages as indicated by stages (355) and (365). The quick chilling or freezing step rapidly increases the viscosity of the continuous phase of the foam product. This increase in viscosity further decreases the diffusivity of the gas through the continuous phase. The increase in viscosity also reduces the tendency of adjacent gas bubbles to coalesce. The increased viscosity also reduces the growth of ice crystal sizes. The end result is a food product that has significantly lower average gas bubble sizes as well as lower average ice crystal sizes, compared to products made by prior art techniques.

The viscosity increasing step can be carried out by exposing an exterior surface of the product (whether or not in a package) to temperature conditions colder than the temperature of the product. This practice is especially useful where the mass of individual units of product is relatively small, such as individual portions of ice cream. Examples of this practice include placing the product in or through a chiller or freezer, in which the atmosphere within the chiller or freezer is colder than the temperature of the product, or contacting an exterior surface of the product with a colder gas, gas mixture or liquefied gas. It is preferred to achieve some or all of the viscosity increasing by chilling the product from within the product, such as in a manner as described herein, especially when the mass of the product is relatively large.

Figure 6:
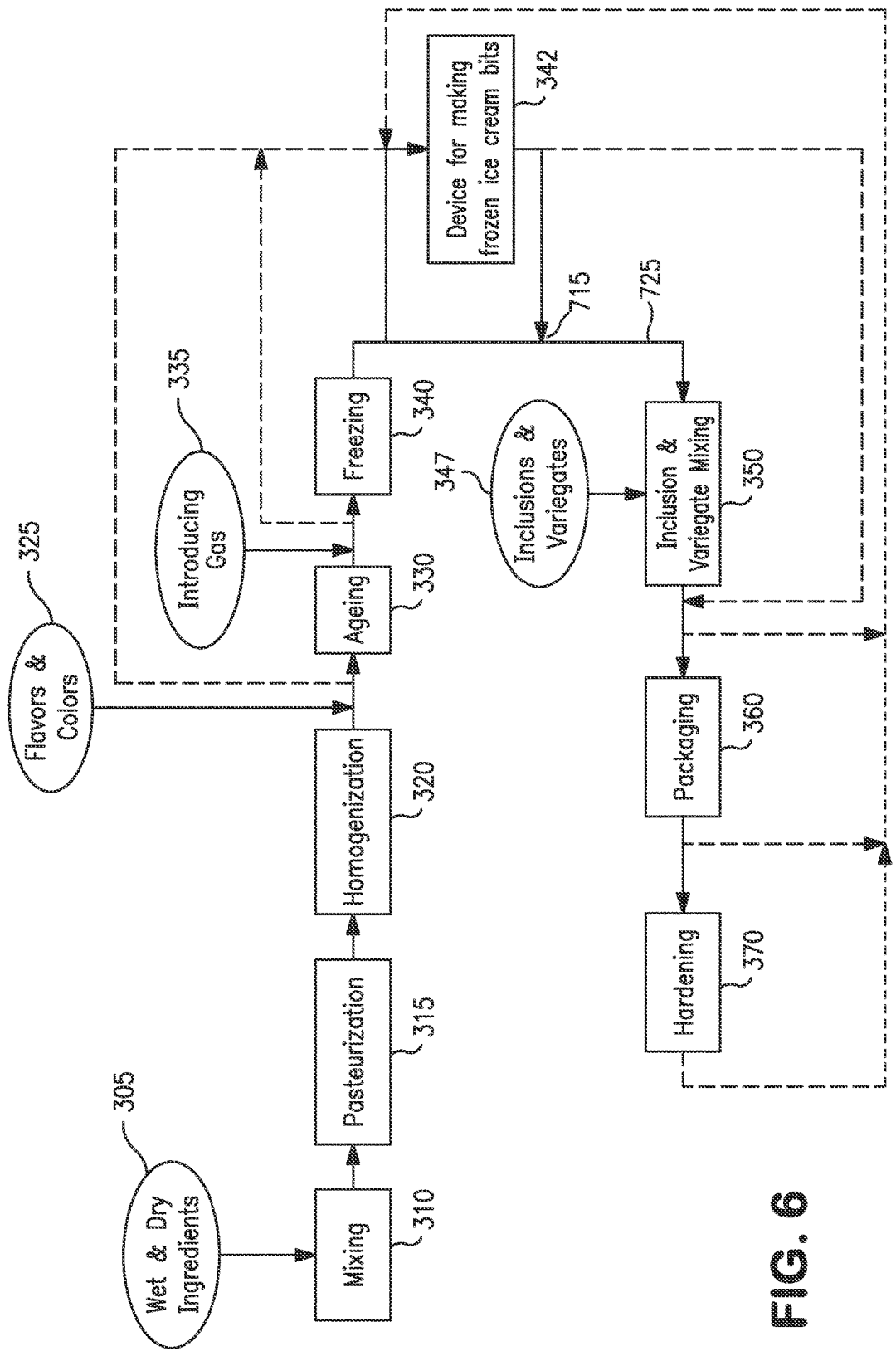
FIG. 6 is another process flowsheet including embodiments of the present invention.

FIG. 6 shows other possible embodiments of the rapid chilling or freezing technique. The partially frozen foam product stream from stage (340) (such as exiting a scraped surface freezer or other functionally equivalent heat exchanger) is split into at least two streams, namely a main stream and one or more secondary streams. Alternatively, the product stream splitting is performed at other stages, for example, after the homogenization (320) stage or after the ageing (330) stage or after the addition of inclusions and variegates (350) or after packaging (360) or after hardening (370). The main stream is preferably 75 percent or more of the full product stream, and more preferably about 90 percent of the full product stream. The main stream is routed directly from stage (340) to the packaging step (360) after optional addition of inclusions and variegates (347) in stage (350). The addition of the inclusions and variegates can take place separately from each other. A preferred embodiment is that the addition of the inclusions take place before the deep frozen bits are added back to the rest of the ice cream, while the variegate addition takes place after the addition of the deep frozen bits.

The secondary stream or streams (together also referred to herein as the "secondary portion") of the ice cream product is preferably 25 percent or less of the full product stream, and more preferably about 10 percent of the full product stream. The secondary portion is diverted to a stage (342) where it is formed into a plurality of nearly uniformly sized bits. The average size of these bits is between 0.25 inch and 2 inch long and more preferably between 0.25 inch up 1.25 inch. By "size" of a bit means the diameter of a sphere having the same surface area as that of the bit. For example, a cylindrical-shaped bit with a diameter of 0.75 inch and a length of 0.5 inch has a surface area of 2.01 inches, and the diameter of a sphere whose surface area is 2.01 inches is 0.81 inch. Thus, the "size" of the bit in this illustration is 0.81 inch. The cross section of these bits can be circular or non-circular. It is also important that the bits are nearly uniform in size, with the preferred standard deviation for the equivalent diameters at or less than 15%, preferably at or less than 10%, and more preferably at or below 5%. Both the actual average size and the deviation of the bits from this average are important parameters that determine the operational reliability of the process (as discussed in examples below). The average size of the bits is also important as it controls the rate of viscosity increase of the total ice cream as explained below.

The bits having these size characteristics can be formed in any of a number of ways. One way is to mold them by adding the material into molds that are dimensioned to form bits having the desired size. Another way is to extrude the material out the exit orifice of an extruder and to then cut off the material that has extruded, where the cross-sectional area of the exit orifice and the length of the extruded material as it is cut off are dimensioned to provide the desired size.

These nearly uniformly sized bits are then rapidly frozen. It is preferable if the rapid freezing is carried out by contact with a cryogen like liquid nitrogen or solid CO2 snow. The rate of drop of average temperature of these bits during the rapid freezing process is at least 20 degrees Fahrenheit per minute and more preferably at least 30 degrees Fahrenheit per minute. The average temperature of the frozen bits after the rapid chilling is preferably at or below −25 degrees Fahrenheit, preferably not below −150 degrees Fahrenheit, and more preferably between −50 degrees Fahrenheit and −100 degrees Fahrenheit. It has been found that when the average temperature of the frozen ice cream bits is below −100 degrees Fahrenheit, there are operational issues in the process and appearance defect issues in the final hardened product. The impact of the average temperature of the frozen foam bits is illustrated in examples below. The average temperature of the frozen ice cream bits is controlled by controlling the contact residence time of the ice cream bits with the cryogen or other cooling media.

The frozen bits are then uniformly distributed into the main product stream prior to or during the packaging step. This mixing of super-cooled bits causes a rapid drop in temperature of the main stream and therefore a rapid increase in its viscosity. This embodiment is a preferred mode of providing rapid chilling of the product from within the product. This method of rapidly increasing the viscosity is insensitive to packaging size and less sensitive to thermal conductivity of the product than current conventional processes.

The frozen bits, or any other products which are added to the product so as to provide chilling from within the product, are preferably added to the product throughout the interior of the mass of the product, and more preferably uniformly throughout the interior of the mass of the product.

Figure 7:
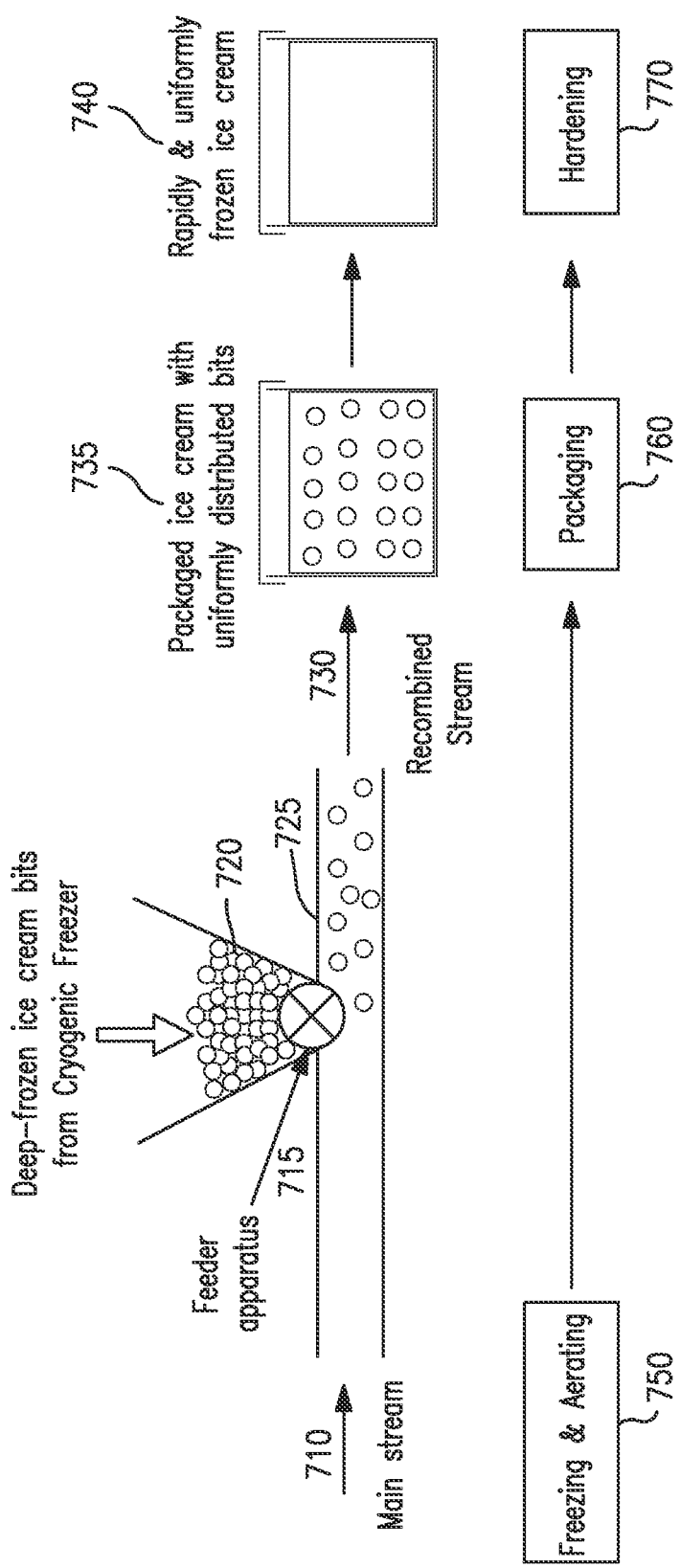
FIG. 7 is an illustration of an embodiment for adjusting the viscosity of a food product in accordance with the present invention.

FIG. 7 is a schematic that shows a process for incorporating the super-cooled side stream bits into the main product stream. The super-cooled bits (720) are distributed into the main stream (710) using an ingredient feeder (715), also known as a fruit feeder, which is commonly used in the ice cream industry to incorporate inclusions like cookie bits, fruits, etc. into the ice cream. It is preferable to heat the walls of the pipe (725) through which the product moves between this ingredient feeder and the filling/packaging machine. Preferably the heating is achieved by circulating hot water through an external jacket. The level of heating is adjusted such that the temperature of the wall of the pipe (725) is between ±3 degrees Fahrenheit of the temperature of the partially frozen product at the exit of stage 340, and more preferably at the temperature of the partially frozen product at the exit of stage 340. The heating of the walls helps reduce operational issues in the process due to the increase of pressure drop in the pipelines (see examples below). The heating of the walls also allows the use of the same standard equipment in the process as would be used in the process without the addition of the frozen ice cream bits. Additionally, heating the pipe helps prevent undesirable appearance of the final product.

The uniformly distributed super-cooled bits in the packaged ice cream (735) act as internal refrigerant centers yielding rapidly and uniformly chilled and/or frozen product (740). This unique approach of using super-cooled or frozen product bits recombined into the main product stream, and preferably into the interior of the product and throughout the product, provides an overall increase in heat transfer rate during processing due to the increase in available heat transfer surface area of the product stream being cooled by the frozen product bits.

It is very important to control the following two parameters (a) fraction of the full product stream that forms the secondary portion of product and (b) average temperature of the deep frozen ice cream bits before it is re-combined with the main stream. These two parameters should be controlled such that after the main stream and secondary streams are re-combined, the resultant heat transfer between the two streams results in an increase in percent of the product solidified and/or frozen in the main stream by at least 2 weight %, and preferably at least 5 weight % and more preferably at least 10 weight %, preferably up to 25 or 30 weight %. The weight % of product solidified is based on the amount of liquid that is present in the product at the end of step (A), i.e. the introduction of the gas or gas mixture (this can be at the beginning of the chilling step where there is a chilling step, otherwise at the beginning of the viscosity increasing step). It is this increase in the percent of product solidified that leads to an increase in viscosity and therefore smaller average bubble and ice crystal sizes in the final product as compared to the product made without the viscosity increase step.

It is also very important to control the rate at which the viscosity of the re-combined ice cream streams rises. If the increase in viscosity of the re-combined ice cream streams is too rapid, it necessitates the use of specialized equipment for the process and/or results in major operational issues and/or results in undesirable appearance of the final packaged product. If the viscosity increase of the ice cream is too rapid, it does not flow well into the packaging, creating appearance issues in the final hardened product. It is preferable that at the time of packaging the average temperature of the re-combined product is not more than 5 degrees Fahrenheit less than the temperature of the product at the exit of stage 340, and more preferably not more than 2 degrees Fahrenheit less than the temperature of the product at the exit of stage 340. Due to the frozen ice cream bits uniformly distributed in the packaging, the average temperature of the packaged product continues to drop after the packaging step. This continuing temperature drop is one of the main reasons for the improved microstructure and quality of the product. On the other hand, if the rise in viscosity of the re-combined stream is too slow, then the benefits of smaller bubble and ice crystal averages sizes are not completely realized.

The rise in viscosity of the re-combined stream is controlled by rate of heat transfer from the warm main stream to the significantly colder ice cream bits. In the current invention, this rise in viscosity is controlled by the following parameters (a) fraction of the full product stream that forms the secondary portion of product, (b) average temperature of the ice cream bits after the rapid freezing step, (c) average size of the ice cream bits that are formed from the secondary product stream.

The heat transfer between the deep frozen ice cream bits and the rest of the ice cream takes place mainly via conduction. The following equation, also known as Fourier's law, is typically used to describe the conduction phenomena $$\frac{Q}{t} = \frac{(q \rho V_{ice\ cream})}{t} = kA_{bits}\frac{(T_{ice\ cream} - T_{bits})}{d} \quad (1)$$

$$\frac{q}{t} = \frac{kA_{bits}}{\rho V_{ice\ cream}}\frac{(T_{ice\ cream} - T_{bits})}{d} \quad (2)$$

The definitions of the variables in the equation (2), with typical units in brackets are; Q=amount of heat transferred (BTU), t=time (minutes), q=Amount of heat transferred per unit mass of ice cream (BTU per pound of product), ρ=density of ice cream (pounds per cubic feet), $V_{ice\ cream}$=volume of ice cream (cubic feet), k=heat transfer coefficient (BTU per feet per degree Fahrenheit per minute), $A_{bits}$=area across which heat transfer takes place or surface area of bits (square feet), d=length across which heat transfer takes place (feet), $T_{ice\ cream}$=temperature of bulk ice cream (degree Fahrenheit), $T_{bits}$=temperature of deep frozen bits (degree Fahrenheit)

Consider a control volume of the re-combined ice cream stream in the shape of a cube of length 'L' and the deep frozen ice cream bit in the shape of a sphere of size '2r'. The volumes of the total re-combined bulk ice cream stream and the volume of the secondary stream are related by the weight percentage of the side stream to the total stream (% SS) as shown below. It is assumed that the densities of the bulk ice cream and the bits are the same.

$$(\%\ SS) * V_{Ice\ Cream} = V_{bits} \quad (3)$$

$$V_{Ice\ Cream} = L^3 \quad (4)$$

$$V_{bits} = \frac{4}{3}\pi r^3 \quad (5)$$

Combining (3), (4) and (5)

$$(\%\ SS) * L^3 = \frac{4}{3}\pi r^3 \quad (6)$$

This gives $$L = r\left(\frac{4}{3}\pi / (\%\ SS)\right)^{1/3} \quad (7)$$

The length of heat transfer 'd' is the distance from the surface of the deep frozen bit to the edge of the cube that represents the bulk ice cream. This is the typical length across which the heat transfer takes place. It is given as $$d = L/2 - r \quad (8)$$

Substituting equation (7) to (8) we get $$d = r\left(\left(\frac{2}{3}\pi / (\%\ SS)\right)^{1/3} - 1\right) \quad (9)$$

Also $$A_{bits} = 4\pi r^2 \quad (10)$$

Substituting the equations (7), (9) and (10) into the main heat conduction equation (1) we get $$\frac{q}{t} = \frac{3k}{\rho} \frac{(\%\ SS)}{r^2\left(\left(\frac{2/3\pi}{(\%\ SS)}\right)^{0.33} - 1\right)}(T_{ice\ cream} - T_{bits}) \quad (11)$$

When the $T_{ice\ cream}$ and $T_{bits}$ in equation (11) are the temperatures of the two stream at the point of when they are re-combined, the q/t that is obtained is the initial rate of heat transfer between the two streams. As the heat transfer continues, these temperatures are continuously changing. In fact, due to the continuous heat transfer, the size of the deep frozen bits also changes due to partial melting of the bits. All of these factors continuously change the heat transfer rate. If we know the initial rate of heat transfer and the product thermal properties which are described herein, it is possible to predict how the rate of heat transfer changes with time. In the present invention, the initial heat transfer rate is controlled within an optimum range to obtain the best results. It is possible to control other heat transfer parameters and achieve the same results.

In equation (11), 'k' represents the heat transfer coefficient between the bits and the rest of the product. The value of 'k' will change with product characteristics like percent overrun and formulation. The value of 'k' for a given product can be determined by carrying out experiments where the drop in average temperature of the re-combined product stream is monitored after the secondary stream is added back. In these initial experiments, parameters like ice cream and bit temperatures, bit size and percent secondary stream are chosen at random or based on experience with the process and product. The temperature drop can be monitored in many ways including using thermocouples in the product. Standard formulas are known to those skilled in the art to convert the measured temperature drop into the initial heat transfer rate. Once we determine this initial heat transfer rate, q/t, equation (11) can be used to determine the value of 'k' for that product. Alternatively, there are many empirical, semi-empirical and theoretical formulas available in literature to calculate the value of the heat transfer coefficient in various frozen food products.

An important embodiment of this invention is that the optimum range for the initial rate of heat transfer, q/t, in equation (11) is 0.75 to 1.25 BTU per pound of product per minute. Once the value of 'k' for a particular product has been determined as per the procedure detailed above, the values of $T_{ice\ cream}$, $T_{bits}$, % SS and size of the bits can be adjusted such that equation (11) gives an initial heat transfer rate between 0.75 and 1.25 BTU per pound of product per minute. For example, for a particular ice cream product it was determined from experimentation that the value of k was 0.025 BTU per inch per minute. For an ice cream product having density of 4 pounds per gallon, at a draw temperature of 20 F, for a 20 percent secondary stream, and an average bit temperature of −75 F, equation (11) gives a range of optimum bit size of 0.71 to 0.91 inches. If the average temperature of the bits in the above example is −150 F, instead of −75 F, then the optimum bit size is in the range of 0.94 to 1.22 inches. If the average temperature of the bits is changed to minus 150 F and additionally the percent secondary stream is reduced to 12.5 weight percent then the optimum bit size is in the range of 0.65 to 0.84 inches. This optimum size of the bits results in an optimum rate of viscosity increase of the re-combined stream such that the resultant final product has at least 15% smaller bubble and ice crystal sizes than would be obtained without the viscosity increase step. The optimum rate of viscosity increase also ensures that there are no operational issues like pipeline freeze ups and that the resultant final product has no appearance issues like undesirable voids in the package or non-uniformly filled packaging.

Alternate embodiments of the rapid cryogenic chilling aspect of the present system and method are performed by following the dashed lines in FIG. 6. In particular, the secondary stream of product may be diverted to the cryogenic chiller or freezer prior to the step of gas mixing or immediately after the step of gas mixing. Still further embodiments include the diversion of pre-packaged stream, packaged stream, the hardened product stream or combinations of any of the above-identified diverted streams to the cryogenic chiller or freezer. Yet a further embodiment of the present system and method includes rapid cryogenic freezing or chilling of the inclusions (e.g. fruit, chocolate chips) or variegates (e.g. syrup) and incorporating the cryogenically chilled or frozen inclusions or variegates into the ice cream stream prior to or during the packaging step Another alternative is forming the secondary stream and therefore the deep frozen bits from ice cream that is of a different color and or flavor than the main stream, thereby producing a final product which has a desirable appearance of varied color and/or flavor patterns. In this manner, the viscosity of the recombined foam product prior to packaging and hardening is further increased. By adding the deep frozen product bits and uniformly dispersing the super-cooled or frozen product bits within the main stream, the recombined product stream is further chilled. This partial freezing of the recombined product stream rapidly increases the product viscosity during processing and significantly reduces gas bubble coalescence and disproportionation during the packaging and hardening of the foam product. In all of these alternatives, the bits as added to the main product, should preferably conform to the properties described herein of particle size, particle size distribution, and temperature of the bits as added to the main product.

Figure 5:
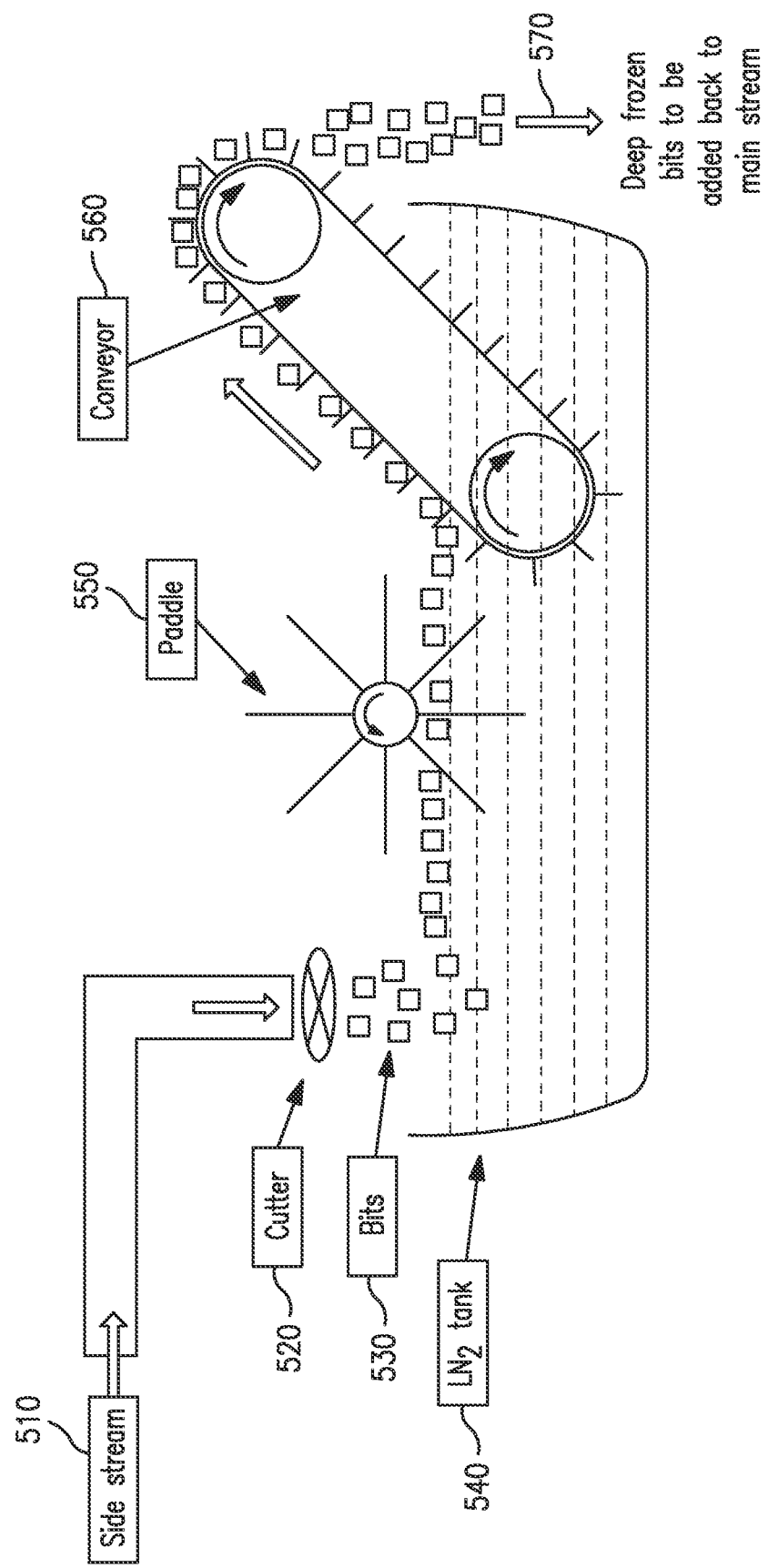
FIG. 5 is an illustration of apparatus useful for making frozen bits that can be used for adjusting the viscosity of a food product in accordance with the present invention.

FIG. 5 is a schematic illustrating a device for creating the super-cooled bits. The side stream (510) is extruded through a cutting device (520) that portions the product into small bits (530), which subsequently fall into liquid nitrogen or equivalent cryogen in tank or vessel (540). The bits can enter tank or vessel (540) in other ways, such as on a conveyor belt, or by being physically carried. The bits spend a sufficient amount of time in the bath so that they can approach liquid nitrogen temperature. A slow moving paddle (550) or equivalent device preferably agitates the bits and controls the residence time of the bits in the cryogen to ensure that the bits exit the device at the desired average temperature. A device such as a conveyor with cleats (560) carries the bits out of the bath. The resulting super-cooled bits (570) should be at or below minus 25 degrees Fahrenheit, preferably not below minus 100 degrees Fahrenheit.

This unique approach of using super-cooled or frozen product bits recombined into the main product stream, and preferably into the interior of the product and throughout the product, provides an overall increase in heat transfer rate during processing due to the increase in available heat transfer surface area of the product stream being cooled by the frozen product bits. This unique advanced cooling technique involving the use of super-cooled or frozen pieces intermixed in large main stream process flows can be applied to various food products other than food foams, such as juices and other liquid or semi-solid food products.

Another method for chilling the product from within is to inject cryogenic gas or liquid into the interior of the mass of product through a plurality of thin conduits or hollow needles.

It should further be appreciated that cryogenic gas or liquid can advantageously be introduced into contact with the product, and/or into the interior of the product, in one or more of the stages described herein.

Further Treatment Including Hardening

Following the viscosity increasing stage, the food product can be hardened by further chilling it. This chilling can be carried out using equipment that chills it from outside of the product, such as in a spiral or tunnel freezer. The targeted final temperature of the hardened product (such as in the case of ice cream) is between zero and minus 20 degrees Fahrenheit. The hardening should achieve freezing of additional liquid present in the product. The product can also be packaged, before or after or even during the hardening stage.

A technique that is useful in controlling the viscosity of the foam product or during the hardening stage, and improving the stability of the foam product, is to introduce a cryogen directly to the foam product as it is being pumped through piping or as it is being packaged. Direct chilling or freezing of the foam product impedes the diffusion of gas bubbles through and out of the foam product and also controls the ice crystal growth process that occurs during packaging and hardening. A preferred method to accomplish this alternate viscosity adjustment and ice crystal growth control is to deliver in-situ cryogenic chilling or freezing as the foam product is being packaged into its container. Yet another embodiment involves mostly indirect cooling of the outside of the piping through which the foam is being pumped. Other useful techniques include those described herein for carrying out the viscosity increasing step.

Advantages of Small Bubble Size

Due to surface tension, the pressure inside a gas bubble is higher than ambient pressure. The pressure inside the bubble is the sum of ambient pressure and the surface tension term;

(2σ/R)

Where σ is the surface tension (which is expressed in units of force per distance, such as Newton per meter;

and R is the radius of the bubble.

Therefore, the smaller the overall diameter of the bubble, the higher is the surface tension effect and therefore the pressure inside the bubble is also higher. This also means that smaller bubbles are less sensitive to changes in ambient pressure.

The present invention provides a further frozen product in which the average bubble size is at least 15% smaller (preferably, 20% smaller, and even more preferably at least 25% smaller) than the average bubble size of a product formed from the identical starting material, with air as the sole gas or gas mixture fed to foam the product, and using identical treatment conditions but omitting the viscosity increase step described herein. Smaller gas bubbles significantly improve both taste and the aesthetic "creaminess" of ice cream and other foam products. Smaller gas bubbles have also been shown to contribute to the formation of smaller ice crystals both during the initial manufacturing of the frozen foam product as well as during subsequent transportation and storage.

Smaller gas bubbles also tend to provide a stronger microstructure within frozen foam products as well as improved melting properties and increased resistance to temperature and pressure fluctuations during storage and transportation. In essence, gas bubbles from a low diffusivity gas such as argon or krypton produce an average diameter reduction of size of at least 15 percent with a narrow bubble size distribution. This creates a stronger and more stable ice cream structure that does not melt as fast; is more tolerant to pressure fluctuations attributed to altitude issues and is much more resistant to temperature fluctuations. This improvement is particularly prevalent when the ice cream is held in long term storage in freezers. Equally important, a stronger microstructure of the ice cream product resulting from use of smaller gas bubbles in the ice cream products also allows use of less milk fats (i.e. a lower weight percentage of milk fats) without compromising the sensory aspects of the ice cream. Less milk fat yields reduced costs and improved dietary and nutritional aspects of the ice cream product.

Another advantage of smaller diameter gas bubbles within a (normally frozen) foam product is that the use of smaller gas bubbles leads to smaller fat droplets and improved fat dispersion which significantly improves taste and the sensory aspects of, for example, ice cream products. In addition, smaller gas bubble diameters also tend to limit the growth of ice crystals during freezing, and subsequent hardening. The more numerous small gas bubbles trap the ice crystals within the foam product and thereby limit accretion or growth of the ice crystals.

However, the experience with prior production has been that smaller gas bubbles are expected to be more prone to disproportionation or diffusing gas molecules both within and outside of the foam product. This phenomenon is due to the higher internal pressure in the small bubbles. As gas bubbles diffuse within the product further increase in the coalescence of smaller bubbles into larger diameter bubbles occurs. During the hardening step, in many ice cream production processes, there is often a significant increase in average bubble size as a result of disproportionation resulting in poor air cell stability. As the ice cream product hardens, the viscosity of the product correspondingly increases and the average bubble size stabilizes. Reducing disproportionation of gas bubbles in an ice cream product significantly suppresses bubble size growth and improves the gas bubble stability in the ice cream product.

Advantageously, the present system and method of enhancing the stability of foam products also allows increase in overrun, thus lowering the cost of production without any adverse effects on the quality of the foam product. Overrun, as previously described, is the ratio of the volume of gas in the foam to the volume of the non-gas portion of the foam. In fact, the present system and apparatus provides beneficial effects on the sensory characteristics of the foam products, such as ice cream. Together with increased overrun, there is a positive synergistic effect on the stability and sensory characteristics regarding the end foam product. Similarly, control of and improvement in the ice crystal formation as well as gas disproportionation rates and gas bubble size and bubble size distribution growth rates in hardened foam products are also realized.

The freezing and hardening steps can be the production limiting steps in many food manufacturing processes. The use of the quick chilling/hardening steps as described herein also have the added benefit of being able to overcome this production limitation, thus allowing manufacturers to increase their production capacity.

The following examples illustrate the main principles and advantages of the present invention. Ice cream has been used for these tests, but any frozen product will display similar behavior.

EXAMPLE 1

Figure 1:
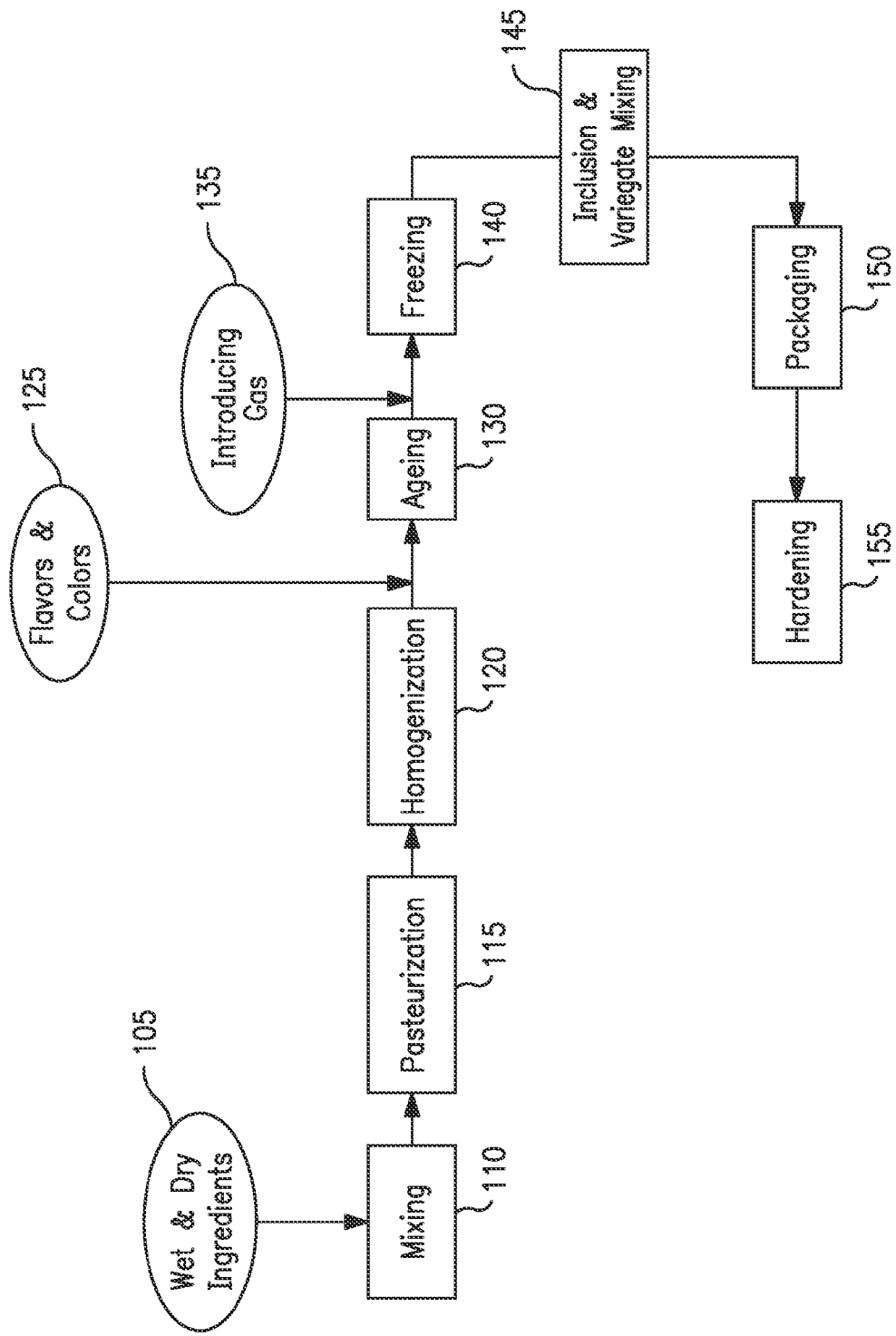
FIG. 1 is a schematic depiction of a prior art process of ice cream manufacturing.
Figure 2:
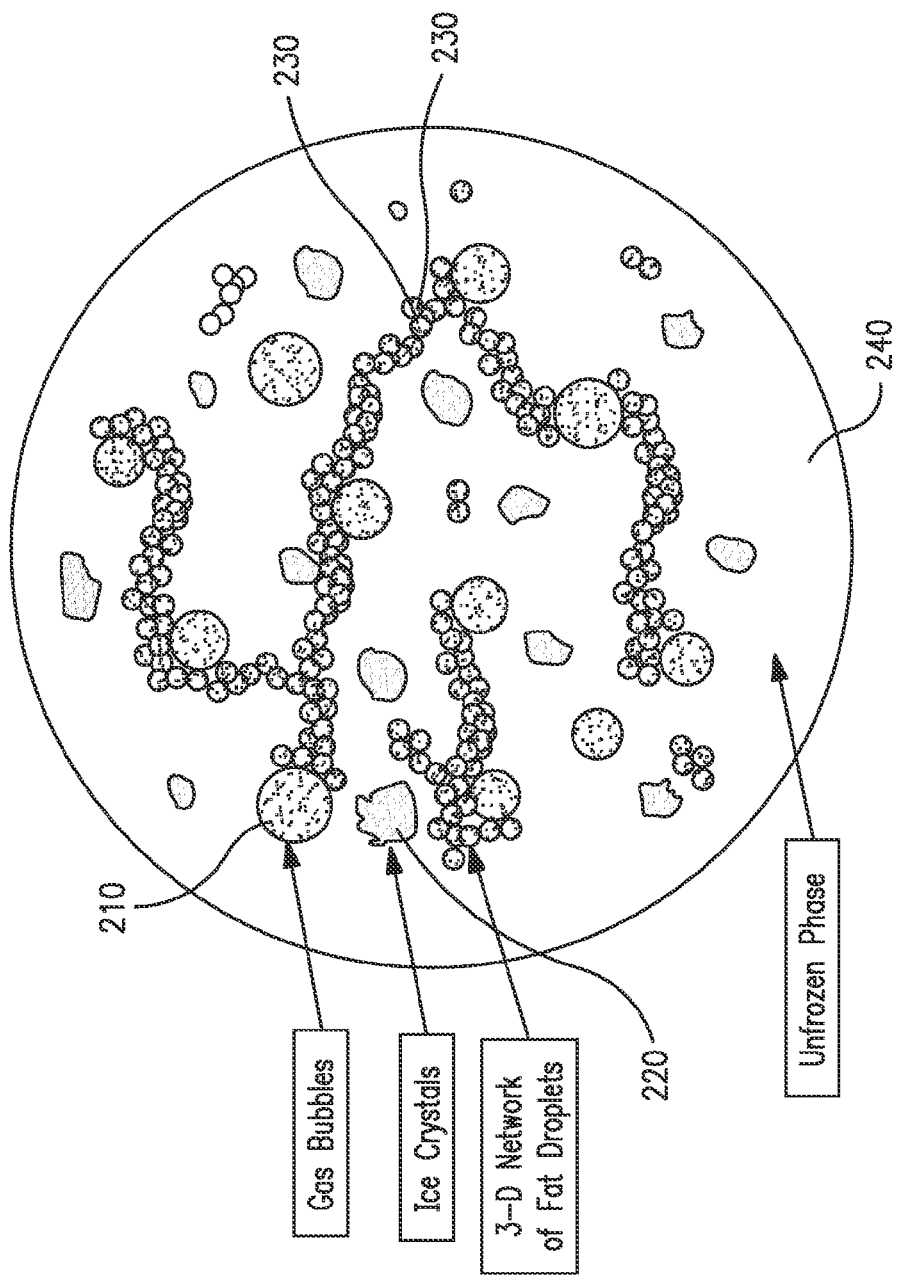
FIG. 2 is an illustration of the microstructure of a frozen foam ice cream product.

Tests were carried out for the manufacture of 5% fat ice cream using the process outlined in FIG. 1, i.e. as per the conventional ice cream making process. The ice cream mix was foamed with air to a 100% overrun and frozen in a scraped surface freezer to a temperature of 20 to 22 degrees Fahrenheit at its exit. The ice cream was then packaged in a 56 ounce container and mechanically hardened in a freezer with an air temperature of −25 degrees Fahrenheit, till the center temperature of the ice cream reached 0 degrees Fahrenheit. The final hardened ice cream was analyzed for its microstructure and it was found that the average bubble size was 12.5 microns and the average ice crystal size was 35.3 microns.

EXAMPLE 2

The test in example 1 was repeated, but in this case the ice cream was foamed with air to 135% overrun (instead of 100% overrun in example 1). The final hardened ice cream was analyzed for its microstructure and it was found that the average bubble size was 17.3 microns and the average ice crystal size was 47.2 microns.

EXAMPLE 3

Tests were carried out for the manufacture of 5% fat ice cream using the process outlined in FIG. 3, i.e. as per the present invention. The ice cream mix was foamed with air to a 135% overrun and frozen in a scraped surface freezer to a temperature of 20 to 22 degrees Fahrenheit at its exit. This exit stream was then split into two, with the secondary stream being approximately 12.5% by weight of the flow rate of the total stream. This secondary stream was passed through an extruder device with a wire cutter, as shown in FIG. 5, where multiple bits were formed with an average size of 0.25 inches. The standard deviation of the average size of the bits was approximately 10%. These bits were then immersed in liquid nitrogen, as shown in FIG. 5, to freeze them to an average temperature of approximately −150 degrees Fahrenheit. These deep frozen ice cream bits were then added back to the primary stream using an industry standard fruit feeder. The re-combined ice cream stream was then packaged in a 56 ounce container and mechanically hardened in a freezer with an air temperature of minus 25 degrees Fahrenheit, till the center temperature of the ice cream reached 0 degrees Fahrenheit.

It should be noted that for the above operating parameters the optimum bit size as determined from equation (11) was in the range of 0.65 to 0.84 inches. Thus the bit size of 0.25 inches results in an initial heat transfer rate that is much faster than the optimum desired rate. Numerous mechanical operation issues were faced during this operation, with frequent freeze ups of the pipeline downstream of the fruit feeder which was used to add the deep frozen bits to the primary stream. These freeze ups were due to an excessive increase in viscosity of the re-combined stream in the pipeline. This excessive viscosity resulted in high pipeline pressures in excess of 60 pounds per square inch at the inlet of the fruit feeder.

EXAMPLE 4

The test in example 3 was repeated, but with the average size of the bits at 1 inch (instead of 0.25 inches in example 3). The change in size was achieved by changing the design of the extrusion plate on the extrusion device (shown in FIG. 5). With the 1 inch average bit size, there were no more freeze ups in the pipelines. The increased bit size reduced the rate at which the viscosity of the re-combined stream increased due to the lower surface area available for heat transfer from the surrounding ice cream to the super-cooled bits. There were, however, frequent buildup of the deep frozen ice cream bits at the mouth of the fruit feeder, which caused frequent stoppages. The buildup was because of bridging at the mouth of the fruit feeder.

EXAMPLE 5

The test in example 3 was repeated, but with average size of the bits at 0.75 inches (instead of 0.25 inches in example 3). This bit size is in the optimum range as calculated by equation (11). At this average size, there were no issues with pipeline freeze ups or with bridging at the fruit feeder mouth. The process ran for several hours without any operational issues. The pipeline pressure at the inlet of the fruit feeder was only 15 to 20 pounds per square inch. However, the re-combined stream does not flow smoothly into the packaging, leaving some part of the packaging un-filled.

EXAMPLE 6

The tests in example 5 was repeated, but with the secondary stream flow rate at 20% of the total flow rate (instead of the 12.5% in example 5). The increase in secondary stream flow rate caused frequent pipeline freeze ups due to excessive rate of viscosity increase of the re-combined stream.

EXAMPLE 7

The test in example 6 was repeated, but using an extrusion device that was designed for a 3% standard deviation of the average size of the bits produced. The design of the extrusion device was as per prior art in this field (U.S. Pat. No. 4,417,610). Due to the more uniformly sized bits, even at 20% secondary stream flow rate, there was no pipeline freezing issues. However, the re-combined stream does not flow smoothly into the packaging, leaving some part of the packaging un-filled and the ice cream also had an undesirable rough look.

EXAMPLE 8

The test in example 7 was repeated, but with the wall of the pipeline downstream of the fruit feeder heated such that its temperature was maintained at 19 to 20 degrees Fahrenheit. The pipeline wall heating resulted in a smooth flow of the re-combined stream into the packaging. The resulting final hardened product was very uniformly filled into the package and the surface of the ice cream was smooth. However, upon sectioning the hardened ice cream it was noticed that there were some internal voids in the ice cream. The extremely cold temperature of the ice cream bits causes shrinkage of the ice cream surrounding these bits, upon re-combination. In addition, the surface of the bits may be absorbing some liquid cryogen. This liquid cryogen vaporizes when the bits are recombined with the main stream. These two reasons lead to the internal voids.

EXAMPLE 9

The test in example 8 was repeated, but with the secondary stream flow rate at 12.5% (instead of 20% for example 8). The process ran for several hours without any operational issues and the re-combined stream flowed smoothly into the packaging. The resulting final hardened product was very uniformly filled into the package.

The final hardened ice cream was analyzed for its microstructure and it was found that the average bubble size was 11.9 microns and the average ice crystal size was 31.7 microns. The microstructure data shows the improvement in ice cream quality due to the present invention as compared to conventional ice cream making process (examples 1 and 2)

Figure 8:
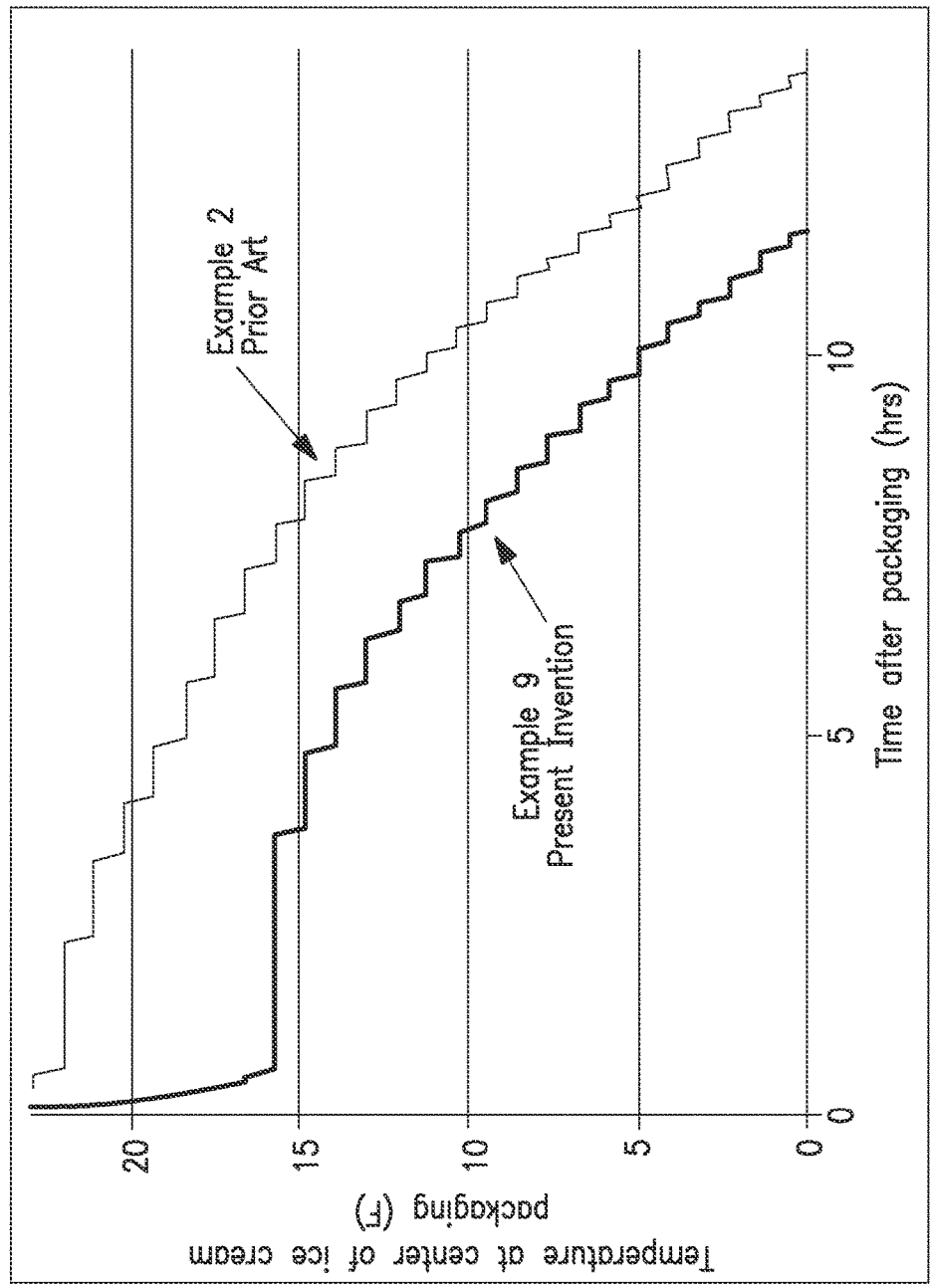
FIG. 8 is a graph that shows the change in temperature at the center of an ice cream package for a prior art process versus for the process as per the present invention.

FIG. 8 shows the rate of drop of the center temperature of the re-combined stream after packaging, and during mechanical hardening. The figure also shows for comparison the center temperature of the ice cream in example 2 above. The rate of drop of temperature for example 9 is much faster than in example 2. This temperature drop results in a rise in viscosity and therefore the smaller average bubble and ice crystal sizes in this product compared to that in example 2.

EXAMPLE 10

The test in example 8 was repeated, but with the average temperature of the frozen ice cream bits at −75 degrees Fahrenheit (instead of −150 degrees Fahrenheit in example 8). The temperature of the frozen bits was controlled by controlling the residence time of the bits in contact with the cryogen. The resulting final hardened ice cream had insignificant levels of internal voids when it was sectioned. The higher temperature of the frozen ice cream bits prevents the formation of the internal voids that were formed due to shrinkage of the ice cream and due to liquid cryogen absorption. By contrast to prior art techniques, the practice of the present invention has been found to permit addition of bits at even a 20 weight. % level, while discharging the product to packaging at 20 F to 22 F, whereas prior art teachings have suggested that at such high levels of bit addition the temperature at discharge to packaging had to be increased to 25 F which is associated with poorer quality of the final ice cream product.

| Parameters | Example Number | | | | | | | | | |
|---|---|---|---|---|---|---|---|---|---|---|
| | 1 | 2 | 3 | 4 | 5 | 6 | 7 | 8 | 9 | 10 |
| Overrun % | 100 | 135 | 135 | 135 | 135 | 135 | 135 | 135 | 135 | 135 |
| % Side stream (w/w) | — | — | 12.5 | 12.5 | 12.5 | 20 | 20 | 20 | 12.5 | 20 |
| IC bit average size (microns) | — | — | 0.25 | 1.0 | 0.75 | 0.75 | 0.75 | 0.75 | 0.75 | 0.75 |
| IC bit std. deviation of avg. size | — | — | 10 | 10 | 10 | 10 | 3 | 3 | 3 | 3 |
| Temp (F.) of frozen bits | — | — | −150 | −150 | −150 | −150 | −150 | −150 | −150 | −75 |
| Pipeline heating | No | No | No | No | No | No | No | Yes | Yes | Yes |
| Operational issues | No | No | Yes | Yes | No | Yes | No | No | No | No |
| Appearance issues | No | No | — | — | Yes | — | Yes | Yes | No | No |

From the foregoing, it should be appreciated that the present invention thus provides a method and system for the improved stability and sensory characteristics of frozen foam products. While the invention herein disclosed has been described by means of specific embodiments and processes or control techniques associated therewith, numerous modifications and variations can be made thereto by those skilled in the art without departing from the scope of the invention as set forth in the claims or sacrificing all of its features and advantages.

Various modifications and changes may be made with respect to the foregoing detailed description and certain embodiments of the invention will become apparent to those skilled in the art without departing from the spirit of the present disclosure.

What is claimed is:

1. A method for forming a frozen foamed food product comprising the steps of:

(A) introducing a nontoxic gas or gas mixture into a product to be foamed under foaming conditions to form a foam product containing bubbles of said gas or gas mixture, (B) concurrently with or subsequent to step (A), chilling said foam product under chilling conditions to form a partially frozen foam product; and then (C) increasing the viscosity of said partially frozen foam product by adding into the partially frozen foam product a side stream of a plurality of bits of edible material having a size (as defined herein) of 0.25 to 2 inch, wherein the size distribution of said bits that are added has a standard deviation of less than or equal to 15%, wherein said bits that are added are at a temperature of less than minus 25 F, thereby forming a further frozen foam product, wherein the rate at which the viscosity of the re-combined ice cream streams rises is controlled by controlling the rate of heat transfer between the bits and the product into which the bits are added, q/t, to a value between 0.75 and 1.25 BTU per minute per pound of the product in accordance with the equation $$\frac{q}{t} = \frac{3k}{\rho} \frac{(\% SS)}{r^2 \left( \left( \frac{2/3\pi}{(\% SS)} \right)^{0.33} - 1 \right)} (T_{icecream} - T_{bits})$$

wherein k is the heat transfer coefficient in BTU per feet per degree Fahrenheit per minute for the heat transfer between the bits and the rest of the ice cream, ρ is the density of the ice cream in pounds per cubic feet, % SS is the weight percentage of the side stream to the total stream, r is the radius of a bit in the shape of a sphere, $T_{ice\ cream}$ is the temperature of the ice cream in degrees Fahrenheit, and $T_{bits}$ is the temperature of the bits in degrees Fahrenheit, and then (D) hardening the further frozen food product by further chilling it under further chilling conditions to freeze additional liquid therein, thereby forming a frozen foamed food product, under conditions effective to establish ice crystals in said frozen foamed food product having an average crystal size at least 15% smaller than the average ice crystal size in the hardened product that is formed by introducing solely air as the gas or gas mixture into the identical product to be foamed under the identical foaming conditions as in step (A) to form an air foamed product and chilling said air foamed product in the same relationship to step (A) and under the identical chilling conditions as in step (B) to form a product which is then hardened under the identical further chilling conditions as in step (D).

2. The method of claim 1 wherein the addition of the plurality of bits results in an increase in percent solidified fraction in the product to which the bits are added by at least 2 weight %, wherein the wt. % of solid is based on the amount of liquid that is present in the product at the end of step (A).

3. The method of claim 1 wherein said bits that are added into the product are at a temperature not lower than minus 150 F.

* * * * *